United States Patent
Nook et al.

(10) Patent No.: US 12,278,445 B2
(45) Date of Patent: Apr. 15, 2025

(54) ELECTRICAL PORT DEVICE

(71) Applicant: THE NOCO COMPANY, Glenwillow, OH (US)

(72) Inventors: Jonathan Lewis Nook, Gates Mills, OH (US); William Knight Nook, Sr., Shaker Heights, OH (US); James Richard Stanfield, Glendale, AZ (US); Derek Michael Underhill, Tempe, AZ (US)

(73) Assignee: The NOCO Company, Glenwillow, OH (US)

( * ) Notice: Subject to any disclaimer, the term of this patent is extended or adjusted under 35 U.S.C. 154(b) by 741 days.

(21) Appl. No.: 17/593,014

(22) PCT Filed: Mar. 6, 2020

(86) PCT No.: PCT/US2020/021461
§ 371 (c)(1),
(2) Date: Sep. 3, 2021

(87) PCT Pub. No.: WO2020/181217
PCT Pub. Date: Sep. 10, 2020

(65) Prior Publication Data
US 2022/0140522 A1    May 5, 2022

Related U.S. Application Data

(60) Provisional application No. 62/815,041, filed on Mar. 7, 2019, provisional application No. 62/815,875, filed on Mar. 8, 2019.

(51) Int. Cl.
*H01R 13/00* (2006.01)
*H01R 13/52* (2006.01)
(Continued)

(52) U.S. Cl.
CPC ....... *H01R 13/5213* (2013.01); *H01R 25/003* (2013.01); *H01R 31/02* (2013.01); *H02G 3/088* (2013.01); *H02G 3/18* (2013.01)

(58) Field of Classification Search
CPC .. H01R 13/5213; H01R 25/003; H01R 31/02; H02G 3/088; H02G 3/18
See application file for complete search history.

(56) References Cited

U.S. PATENT DOCUMENTS 5,462,452 A    10/1995    Devine
5,571,023 A    11/1996    Anthony
(Continued)

FOREIGN PATENT DOCUMENTS

DE    102004025426 B4    10/2007
JP       H8-190940 A      7/1996

OTHER PUBLICATIONS

IP Australia, Appl. 2020231409, Examination Report No. 1, Jun. 23, 2022.

(Continued)

*Primary Examiner* — Phuong Chi Thi Nguyen
(74) *Attorney, Agent, or Firm* — Jones Day

(57) ABSTRACT

An electrical port device having an electrical port and a cap or cover removable connected to the electrical port having a plug. An electrical cord or cable or cable section connects the electrical port to an electrical cord or cable or cable connector or splitter into a pair of electrical cord or cable or cable sections each provided with an electrical receptacle. Further, the cap or cover and the electrical port have cooperating sealing surfaces to ensure a tight waterproof sealing when the cap or cover is installed on the electrical port to prevent water or moisture reaching the plug.

17 Claims, 8 Drawing Sheets

(51) Int. Cl.
*H01R 25/00* (2006.01)
*H01R 31/02* (2006.01)
*H02G 3/08* (2006.01)
*H02G 3/18* (2006.01)

(56) References Cited

U.S. PATENT DOCUMENTS

| | | | |
|---|---|---|---|
| 5,588,853 | A | 12/1996 | Anthony |
| 5,924,893 | A | 7/1999 | Eidsvig |
| 6,767,255 | B1 | 7/2004 | Croswell |
| 8,172,589 | B2 | 5/2012 | Johnson et al. |
| D684,929 | S | 6/2013 | Nook et al. |
| 9,572,737 | B2 | 2/2017 | McNeely et al. |
| 9,584,038 | B2 | 2/2017 | Linderman |
| D800,666 | S | 10/2017 | Nook et al. |
| 10,114,176 | B2 * | 10/2018 | Gimblet ............... G02B 6/3849 |
| 2004/0256135 | A1 | 12/2004 | Liu |
| 2005/0215114 | A1 | 9/2005 | Johnsen et al. |
| 2009/0130892 | A1 | 5/2009 | Pech et al. |
| 2014/0073180 | A1 | 3/2014 | Knight et al. |
| 2016/0001666 | A1 | 1/2016 | Nook et al. |
| 2017/0288335 | A1 | 10/2017 | Hsu |
| 2018/0215274 | A1 | 8/2018 | Nook et al. |

OTHER PUBLICATIONS

IP Australia, Appl. 2020231409, Examination Report No. 2, Aug. 10, 2022.
Canadian IP Office, Appl. 3,132,558, Examination Report, Dec. 6, 2022.
European Patent Office, Appl. 20765676.0, Extended European Search Report, Dec. 5, 2022.
IP India, Appl. 202137040082, Examination Report, Jul. 14, 2022.
Japan Patent Office, Appl. 2021-552854, Decision for Refusal, Sep. 13, 2022.
Patent Cooperation Treaty, PCT/US2020/021461, International Search Report and Written Opinion, Jun. 11, 2020.
UK Patent Office, Appl. GB2112736.0, Examination Report, Sep. 7, 2022.
Noco—etrailer Noco Battery Chargers 329-GCP1 Review, Dec. 4, 2018 [www.youtube.com/watch?v=wS09fiFkVIY].
UK Patent Office, Appl. GB2112736.0, Examination Report, Jan. 24, 2023.
Canadian Patent Office, Appl. 3,312,558, Examination Report, Jun. 19, 2023.
CNIPA, Appl. 20208001868.0, Office Action, Feb. 24, 2023.
Japan Patent Office, Appl. 2021-552854, Decision for Refusal, Mar. 14, 2023.
Noco—AC Port Plug—GCP1, Product Brochure, Aug. 2018.

* cited by examiner

ELECTRICAL PORT DEVICE

FIELD

The present invention is directed to an electrical port device, for example, an AC electrical port providing one or more electrical connections.

BACKGROUND

U.S. D684,929 discloses an AC port. There exists a need for an improved electrical port, for example, an AC port.

SUMMARY

The present invention is directed to an electrical port device, including an electrical port provided with a removable cap or cover. The electrical port is provided with a receptacle fitted with an electrical connector (e.g. electrical plug, electrical receptacle). The electrical port device further includes another electrical connector (e.g. electrical receptacle, electrical plug) with an electrical cord connecting the electrical port and another electrical connector together.

The electrical port is connected to an electrical cord or cable having one electrical cord section connected to an electrical cord or cable connector, and a pair of electrical cord sections connecting the electrical cord or cable connector to a pair of electrical receptacles. Thus, the electrical cord or cable connector functions as an electrical cord or cable splitter for electrically splitting the one electrical cord or cable section into the pair of electrical cord or cable sections.

The electrical port and the removable cap or cover are configured to provide a water tight seal between the electrical port and the removable cap or cover when the removable cap or cover is installed "on" the electrical port to prevent water or moisture from entering the receptacle of the electrical port. The electrical port includes a flange surrounding the receptacle of the electrical port.

An enhanced water tight seal is achieved by providing an elevated ring-shaped ridge having an elevated flat ring-shaped surface on the front face of the flange of the electrical port. Specifically, the ring-shaped ridge is elevated a predetermined distance above the front face surface of the electrical port. This arrangement reduces the size of the sealing area of the flat ring-shaped surface of the ring-shaped ridge to concentrate the sealing force between the cap or cover and the ring-shaped ridge to a smaller sealing area. Further, the inner and outer edges of the ring-shaped ridge can press into the soft or resilient material of the cap or cover so that the inner and outer edges more effectively seal the cap or cover with the ring-shaped ridge.

Further, the another electrical connector, for example, electrical receptacle connected to the electrical port via the electrical cord or cable, can be provided with protrusions to enhance the ability of a user to grip and connect or disconnect the another electrical connected with a further electrical connector. For example, an X-shaped protrusion can be provided to allow a user to grip the electrical connector with his or her fingers to connect or disconnect the electrical connector with another connector.

The presently described subject matter is directed to an electrical port device.

The presently described subject matter is directed to an enhanced electrical port device.

The presently described subject matter is directed to an enhanced AC port device.

The presently described subject matter is directed to an electrical port device, comprising or consisting of: an electrical port having a housing provided with a receptacle and a flange surrounding the receptacle; a cover removable disposed within the receptacle to cover and uncover the plug; an electrical plug disposed within the receptacle; two or more electrical receptacles; and an electrical cord or cable electrically connecting together the electrical port and the two or more electrical receptacles.

The presently described subject matter is directed to an electrical port device, comprising or consisting of: an electrical port having a housing provided with a receptacle and a flange surrounding the receptacle; an electrical plug disposed within the receptacle; a cover removable disposed within the receptacle to cover and uncover the plug; two or more electrical receptacles; and an electrical cord or cable electrically connecting together the electrical port and the two or more electrical receptacles, the electrical cord or cable comprising one electrical cord or cable section connected to a pair of electrical or cable sections.

The presently described subject matter is directed to an electrical port device, comprising or consisting of: an electrical port having a housing provided with a receptacle and a flange surrounding the receptacle; an electrical plug disposed within the receptacle; a cover removable disposed within the receptacle to cover and uncover the plug; two or more electrical receptacles; an electrical cord or cable electrically connecting together the electrical port and the two or more electrical receptacles, the electrical cord or cable comprising one electrical cord or cable section connected to a pair of electrical cord or cable sections; and an electrical cord or cable connector for connecting the one electrical cord or cable section to the pair of electrical cord or cable sections.

The presently described subject matter is directed to an electrical port device, comprising or consisting of: an electrical port having a housing provided with a receptacle and a flange surrounding the receptacle; an electrical plug disposed within the receptacle; a cover removable disposed within the receptacle to cover and uncover the plug; two or more electrical receptacles; and an electrical cord or cable electrically connecting together the electrical port and the two or more electrical receptacles, wherein the electrical cord or cable comprises a cord or cable connector configured to connect one electrical cord or cable section between the cord or cable connector and the electrical port, and electrically connect a pair of electrical cord or cable sections between the cord or cable connector and respective electrical receptacles.

The presently described subject matter is directed to an electrical port device, comprising or consisting of: an electrical port having a housing provided with a receptacle and a flange surrounding the receptacle; an electrical plug disposed within the receptacle; a cover removable disposed within the receptacle to cover and uncover the plug; two or more electrical receptacles; and an electrical cord or cable electrically connecting together the electrical port and the two or more electrical receptacles, wherein the electrical cord or cable comprises a cord or cable connector configured to connect one electrical cord or cable section between the cord or cable connector and the electrical port, and electrically connect with a pair of electrical cord or cable sections located between the cord or cable connector and respective electrical receptacles, and wherein the cord or cable connector is configured with one connector section provided on one side of the cord or cable connector and a pair of connector section provided on an opposite side of the cord or cable connector.

The presently described subject matter is directed to an electrical port device, comprising or consisting of: an electrical port having a housing provided with a receptacle and a flange surrounding the receptacle; an electrical plug disposed within the receptacle; a cover removable disposed within the receptacle to cover and uncover the plug; two or more electrical receptacles; and an electrical cord or cable electrically connecting together the electrical port and the two or more electrical receptacles, wherein the electrical cord or cable comprises a cord or cable connector configured to connect one electrical cord or cable section between the cord or cable connector and the electrical port, and electrically connect with a pair of electrical cord or cable sections located between the cord or cable connector and respective electrical receptacles, wherein the cord or cable connector is configured with one connector section provided on one side of the cord or cable connector and a pair of connector section provided on an opposite side of the cord or cable connector, and wherein the one connector section is oriented parallel with respect to the pair of connector sections.

The presently described subject matter is directed to an electrical port device, comprising or consisting of: an electrical port having a housing provided with a receptacle and a flange surrounding the receptacle; an electrical plug disposed within the receptacle; a cover removable disposed within the receptacle to cover and uncover the plug; two or more electrical receptacles; and an electrical cord or cable electrically connecting together the electrical port and the two or more electrical receptacles, wherein the electrical cord or cable comprises a cord or cable connector configured to connect one electrical cord or cable section between the cord or cable connector and the electrical port, and electrically connect with a pair of electrical cord or cable sections located between the cord or cable connector and respective electrical receptacles, wherein the one electrical cord or cable section and the pair of electrical cord or cable sections each having one or more slots to enhance the flexibility of connections with the cord or cable connector.

The presently described subject matter is directed to an electrical port device, comprising or consisting of: an electrical port having a housing provided with a receptacle and a flange surrounding the receptacle; an electrical plug disposed within the receptacle; a cover removable disposed within the receptacle to cover and uncover the plug; two or more electrical receptacles; and an electrical cord or cable electrically connecting together the electrical port and the two or more electrical receptacles, wherein the electrical cord or cable comprises a cord or cable connector configured to connect one electrical cord or cable section between the cord or cable connector and the electrical port, and electrically connect with a pair of electrical cord or cable sections located between the cord or cable connector and respective electrical receptacles, wherein the cord or cable connector is an electrical splitter and electrically splits the one electrical cord or cable section into the pair of cord or cable sections.

The presently described subject matter is directed to an electrical port device, comprising or consisting of: an electrical port having a housing provided with a receptacle and a flange surrounding the receptacle; an electrical plug disposed within the receptacle; a cover removable disposed within the receptacle to cover and uncover the plug; two or more electrical receptacles; and an electrical cord or cable electrically connecting together the electrical port and the two or more electrical receptacles, wherein a length of the cord or cable connector is greater than a width of the cord or cable connector.

The presently described subject matter is directed to an electrical port device, comprising or consisting of: an electrical port having a housing provided with a receptacle and a flange surrounding the receptacle; an electrical plug disposed within the receptacle; a cover removable disposed within the receptacle to cover and uncover the plug; two or more electrical receptacles; and an electrical cord or cable electrically connecting together the electrical port and the two or more electrical receptacles, wherein the electrical cord or cable comprises a cord or cable connector configured to connect one electrical cord or cable section between the cord or cable connector and the electrical port, and electrically connect with a pair of electrical cord or cable sections located between the cord or cable connector and respective electrical receptacles, wherein the cord or cable connector is provided with an X-shaped protrusion to enhance gripping of the cord or cable connector by a user.

The presently described subject matter is directed to an electrical port device, comprising or consisting of: an electrical port having a housing provided with a receptacle and a flange surrounding the receptacle; an electrical plug disposed within the receptacle; a cover removable disposed within the receptacle to cover and uncover the plug; two or more electrical receptacles; and an electrical cord or cable electrically connecting together the electrical port and the two or more electrical receptacles, wherein the flange has a circular-shaped ridge and the cover includes an inner circular-shaped sealing surface for sealingly cooperating with the circular-shaped ridge of the flange of the electrical port.

The presently described subject matter is directed to an electrical port device, comprising or consisting of: an electrical port having a housing provided with a receptacle and a flange surrounding the receptacle; an electrical plug disposed within the receptacle; a cover removable disposed within the receptacle to cover and uncover the plug; two or more electrical receptacles; and an electrical cord or cable electrically connecting together the electrical port and the two or more electrical receptacles, wherein the flange has a circular-shaped ridge and the cover includes an inner circular-shaped sealing surface for sealingly cooperating with the circular-shaped ridge of the flange of the electrical port, and wherein the circular-shaped ridge of the flange of the electrical port is provided with a flat face.

The presently described subject matter is directed to an electrical port device, comprising or consisting of: an electrical port having a housing provided with a receptacle and a flange surrounding the receptacle; an electrical plug disposed within the receptacle; a cover removable disposed within the receptacle to cover and uncover the plug; two or more electrical receptacles; and an electrical cord or cable electrically connecting together the electrical port and the two or more electrical receptacles, wherein the flange has a circular-shaped ridge and the cover includes an inner circular-shaped sealing surface for sealingly cooperating with the circular-shaped ridge of the flange of the electrical port, wherein the flat face of the circular-shaped ridge is elevated a predetermined distance above an outer face of the flange of the electrical port.

The presently described subject matter is directed to an electrical port device, comprising or consisting of: an electrical port having a housing provided with a receptacle and a flange surrounding the receptacle; an electrical plug disposed within the receptacle; a cover removable disposed within the receptacle to cover and uncover the plug; two or more electrical receptacles; and an electrical cord or cable electrically connecting together the electrical port and the two or more electrical receptacles, further comprising a gasket provided on an inner side of the flange of the electrical port.

The presently described subject matter is directed to an electrical port device, comprising or consisting of: an electrical port having a housing provided with a receptacle and a flange surrounding the receptacle; an electrical plug disposed within the receptacle; a cover removable disposed within the receptacle to cover and uncover the plug; two or more electrical receptacles; and an electrical cord or cable electrically connecting together the electrical port and the two or more electrical receptacles, further comprising a gasket provided on an inner side of the flange of the electrical port, wherein the cover or cap is connected to the gasket.

The presently described subject matter is directed to an electrical port device, comprising or consisting of: an electrical port having a housing provided with a receptacle and a flange surrounding the receptacle; an electrical plug disposed within the receptacle; a cover removable disposed within the receptacle to cover and uncover the plug; two or more electrical receptacles; and an electrical cord or cable electrically connecting together the electrical port and the two or more electrical receptacles, further comprising a gasket provided on an inner side of the flange of the electrical port, wherein the cover or cap is connected to the gasket, wherein the cover is connected to the gasket by a flexible connector.

The presently described subject matter is directed to an electrical port device, comprising or consisting of: an electrical port having a housing provided with a receptacle and a flange surrounding the receptacle; an electrical plug disposed within the receptacle; a cover removable disposed within the receptacle to cover and uncover the plug; two or more electrical receptacles; and an electrical cord or cable electrically connecting together the electrical port and the two or more electrical receptacles, further comprising a gasket provided on an inner side of the flange of the electrical port, wherein the cover or cap is connected to the gasket, wherein the cover is connected to the gasket by a flexible connector, and wherein the cover, gasket, and flexible connector are constructed as a single piece.

The presently described subject matter is directed to an electrical port device, comprising or consisting of: an electrical port having a housing provided with a receptacle and a flange surrounding the receptacle; an electrical plug disposed within the receptacle; a cover removable disposed within the receptacle to cover and uncover the plug; two or more electrical receptacles; and an electrical cord or cable electrically connecting together the electrical port and the two or more electrical receptacles, wherein the cover comprises a collar for fitting into the receptacle of the electrical port.

The presently described subject matter is directed to an electrical port device, comprising or consisting of: an electrical port having a housing provided with a receptacle and a flange surrounding the receptacle; an electrical plug disposed within the receptacle; a cover removable disposed within the receptacle to cover and uncover the plug; two or more electrical receptacles; and an electrical cord or cable electrically connecting together the electrical port and the two or more electrical receptacles, wherein the flange has a circular-shaped ridge and the cover includes an inner circular-shaped sealing surface for sealingly cooperating with the circular-shaped ridge of the flange of the electrical port, wherein the collar comprises one or more outer ridges.

The presently described subject matter is directed to an electrical port device, comprising or consisting of: an electrical port having a housing provided with a receptacle and a flange surrounding the receptacle; an electrical plug disposed within the receptacle; a cover removable disposed within the receptacle to cover and uncover the plug; two or more electrical receptacles; and an electrical cord or cable electrically connecting together the electrical port and the two or more electrical receptacles, wherein the receptacle is provided with a protrusion to facilitate gripping of the receptacle by a user.

The presently described subject matter is directed to an electrical port device, comprising or consisting of: an electrical port having a housing provided with a receptacle and a flange surrounding the receptacle; an electrical plug disposed within the receptacle; a cover removable disposed within the receptacle to cover and uncover the plug; two or more electrical receptacles; and an electrical cord or cable electrically connecting together the electrical port and the two or more electrical receptacles, wherein the cord or cable connector is provided with an X-shaped protrusion.

The presently described subject matter is directed to an electrical port device, comprising or consisting of: an electrical port having a housing provided with a receptacle and a flange surrounding the receptacle; an electrical plug disposed within the receptacle; a cover removable disposed within the receptacle to cover and uncover the plug; two or more electrical receptacles; and an electrical cord or cable electrically connecting together the electrical port and the two or more electrical receptacles, wherein the housing is provided with a venting/drain hole.

The presently described subject matter is directed to an electrical port device, comprising or consisting of: an electrical port having a housing with a flange surrounding a receptacle, the flange having a circular-shaped ridge; an electrical plug disposed within the receptacle; a cover removable disposed within the receptacle to cover and uncover the plug, the cover including an inner circular-shaped sealing surface for sealingly cooperating with the circular-shaped ridge of the flange of the electrical port; an electrical receptacle; and an electrical cord electrically connecting together the electrical port and the electrical receptacle.

The presently described subject matter is directed to an electrical port device, comprising or consisting of: an electrical port having a flange surrounding a receptacle, the flange having a circular-shaped ridge with a flat face; an electrical plug disposed within the receptacle; a cover removable disposed within the receptacle to cover and uncover the plug, the cover including an inner circular-shaped sealing surface for sealingly cooperating with the flat face of the circular-shaped ridge of the flange of the electrical port; an electrical receptacle; and an electrical cord electrically connecting together the electrical port and the electrical receptacle.

The presently described subject matter is directed to an electrical port device, comprising or consisting of: an electrical port having a housing with a flange surrounding a receptacle, the flange having a circular-shaped ridge with a flat sealing face; an electrical plug disposed within the receptacle; a cover removable disposed within the receptacle to cover and uncover the plug, the cover including a collar having one or more outer sealing ridges and an inner circular-shaped sealing surface for sealingly cooperating with the flat sealing face of the circular-shaped ridge of the flange of the electrical port; an electrical receptacle; and an electrical cord electrically connecting together the electrical port and the electrical receptacle.

The presently described subject matter is directed to an electrical port device, comprising or consisting of: an electrical port having a flange surrounding a receptacle, the flange having a circular-shaped ridge; an electrical plug disposed within the receptacle; a cover removable disposed within the receptacle to cover and uncover the plug, the cover including an inner circular-shaped sealing surface for sealingly cooperating with the circular-shaped ridge of the flange of the electrical port; an electrical receptacle; and an electrical cord electrically connecting together the electrical port and the electrical receptacle, wherein the circular-shaped ridge of the flange of the electrical port is provided with a flat face.

The presently described subject matter is directed to an electrical port device, comprising or consisting of: an electrical port having a flange surrounding a receptacle, the flange having a circular-shaped ridge; an electrical plug disposed within the receptacle; a cover removable disposed within the receptacle to cover and uncover the plug, the cover including an inner circular-shaped sealing surface for sealingly cooperating with the circular-shaped ridge of the flange of the electrical port; an electrical receptacle; and an electrical cord electrically connecting together the electrical port and the electrical receptacle, wherein the flat face of the circular-shaped ridge is elevated a predetermined distance above an outer face of the flange of the electrical port.

The presently described subject matter is directed to an electrical port device, comprising or consisting of: an electrical port having a flange surrounding a receptacle, the flange having a circular-shaped ridge; an electrical plug disposed within the receptacle; a cover removable disposed within the receptacle to cover and uncover the plug, the cover including an inner circular-shaped sealing surface for sealingly cooperating with the circular-shaped ridge of the flange of the electrical port; an electrical receptacle; and an electrical cord electrically connecting together the electrical port and the electrical receptacle, further comprising a gasket provided on an inner side of the flange of the electrical port.

The presently described subject matter is directed to an electrical port device, comprising or consisting of: an electrical port having a flange surrounding a receptacle, the flange having a circular-shaped ridge; an electrical plug disposed within the receptacle; a cover removable disposed within the receptacle to cover and uncover the plug, the cover including an inner circular-shaped sealing surface for sealingly cooperating with the circular-shaped ridge of the flange of the electrical port; an electrical receptacle; and an electrical cord electrically connecting together the electrical port and the electrical receptacle, further comprising a gasket provided on an inner side of the flange of the electrical port, wherein the cover is connected to the gasket.

The presently described subject matter is directed to an electrical port device, comprising or consisting of: an electrical port having a flange surrounding a receptacle, the flange having a circular-shaped ridge; an electrical plug disposed within the receptacle; a cover removable disposed within the receptacle to cover and uncover the plug, the cover including an inner circular-shaped sealing surface for sealingly cooperating with the circular-shaped ridge of the flange of the electrical port; an electrical receptacle; and an electrical cord electrically connecting together the electrical port and the electrical receptacle, further comprising a gasket provided on an inner side of the flange of the electrical port, wherein the cover is connected to the gasket by a flexible connector.

The presently described subject matter is directed to an electrical port device, comprising or consisting of: an electrical port having a flange surrounding a receptacle, the flange having a circular-shaped ridge; an electrical plug disposed within the receptacle; a cover removable disposed within the receptacle to cover and uncover the plug, the cover including an inner circular-shaped sealing surface for sealingly cooperating with the circular-shaped ridge of the flange of the electrical port; an electrical receptacle; and an electrical cord electrically connecting together the electrical port and the electrical receptacle, further comprising a gasket provided on an inner side of the flange of the electrical port, wherein the cover is connected to the gasket by a flexible connector, wherein the cover, gasket, and flexible connector are constructed as a single piece.

The presently described subject matter is directed to an electrical port device, comprising or consisting of: an electrical port having a flange surrounding a receptacle, the flange having a circular-shaped ridge; an electrical plug disposed within the receptacle; a cover removable disposed within the receptacle to cover and uncover the plug, the cover including an inner circular-shaped sealing surface for sealingly cooperating with the circular-shaped ridge of the flange of the electrical port; an electrical receptacle; and an electrical cord electrically connecting together the electrical port and the electrical receptacle, further comprising a gasket provided on an inner side of the flange of the electrical port, wherein the cover comprises a collar for fitting into the receptacle of the electrical port.

The presently described subject matter is directed to an electrical port device, comprising or consisting of: an electrical port having a flange surrounding a receptacle, the flange having a circular-shaped ridge; an electrical plug disposed within the receptacle; a cover removable disposed within the receptacle to cover and uncover the plug, the cover including an inner circular-shaped sealing surface for sealingly cooperating with the circular-shaped ridge of the flange of the electrical port; an electrical receptacle; and an electrical cord electrically connecting together the electrical port and the electrical receptacle, further comprising a gasket provided on an inner side of the flange of the electrical port, wherein the cover comprises a collar for fitting into the receptacle of the electrical port, wherein the collar comprises one or more outer ridges.

The presently described subject matter is directed to an electrical port device, comprising or consisting of: an electrical port having a flange surrounding a receptacle, the flange having a circular-shaped ridge; an electrical plug disposed within the receptacle; a cover removable disposed within the receptacle to cover and uncover the plug, the cover including an inner circular-shaped sealing surface for sealingly cooperating with the circular-shaped ridge of the flange of the electrical port; an electrical receptacle; and an electrical cord electrically connecting together the electrical port and the electrical receptacle, wherein the receptacle is provided with a protrusion to facilitate gripping of the receptacle by a user.

The presently described subject matter is directed to an electrical port device, comprising or consisting of: an electrical port having a flange surrounding a receptacle, the flange having a circular-shaped ridge; an electrical plug disposed within the receptacle; a cover removable disposed within the receptacle to cover and uncover the plug, the cover including an inner circular-shaped sealing surface for sealingly cooperating with the circular-shaped ridge of the flange of the electrical port; an electrical receptacle; and an electrical cord electrically connecting together the electrical port and the electrical receptacle, wherein the protrusion is an X-shaped protrusion.

The presently described subject matter is directed to an electrical port device, comprising or consisting of: an electrical port having a flange surrounding a receptacle, the flange having a circular-shaped ridge; an electrical plug disposed within the receptacle; a cover removable disposed within the receptacle to cover and uncover the plug, the cover including an inner circular-shaped sealing surface for sealingly cooperating with the circular-shaped ridge of the flange of the electrical port; an electrical receptacle; and an electrical cord electrically connecting together the electrical port and the electrical receptacle, further comprising a gasket provided on an inner side of the flange of the electrical port, wherein the cover comprises a collar for fitting into the receptacle of the electrical port, wherein the housing is provided with a venting/drain hole.

DETAILED DESCRIPTION

Figure 1:
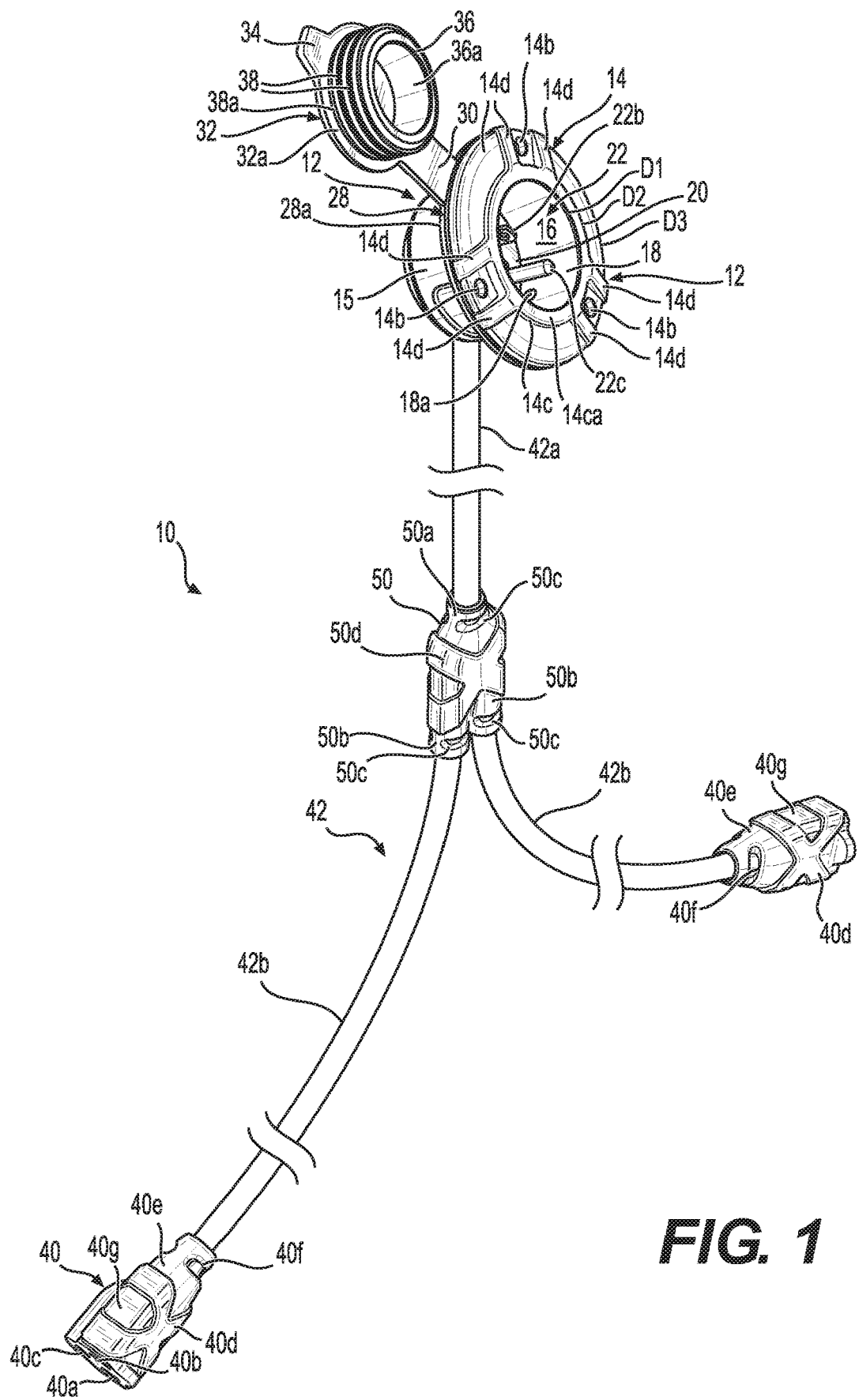
FIG. 1 is a perspective view of an electrical port device according to the present invention with the cap or cover "off."

An electrical port device 10 according to the present invention is shown in FIGS. 1-8.

The electrical port device 10 comprises an electrical port 12 having a flange 14 fixed to a housing 15. The housing 15 is provided with a receptacle 16 defined by a cylindrical-shaped wall 18 and a bottom wall 20. The cylindrical-shaped wall 18 is provided with a lower drain hole 18a (FIGS. 1 and 7) for venting the receptacle 16 and draining any water or moisture located within the receptacle 16 that drains to the lowest point in the receptacle 16 by gravity.

The flange 14 is provided with an outer face 14a and through holes 14b (FIG. 1) for accommodating a fastener (e.g. screws, rustproof screws, stainless steel screws, anodized aluminum screws) for mounting the electrical port 12, for example, into a hole provided in a wall or sheet.

The receptacle 16 accommodates, for example, a male or female electrical connector such as an electrical plug 22 (i.e. male electrical connector) having a neutral prong 22a, an active prong 22b, and an earth prong 22c extending outwardly from the inner bottom wall 20 into the receptacle 16. The housing 15 of the electrical port 12 is provided with a wire sleeve 24 (FIG. 3) having slots 24a for making the wire sleeve 24 flexible or bendable. The wire sleeve 24, for example, can be a plastic injection molded sleeve fitted over the electrical cord or cable 42 and connected to the housing 15 of the electrical port 12 (e.g. snap fit, interference fit, mechanical fit, or adhesive fit).

A gasket 28 (e.g. resilient plastic injection molded flat flexible gasket) having an inner cylindrical-shaped hole is installed over the housing 15 onto the backside surface of the flange 14. For example, the gasket 28 fits between the flange 14 and a wall surface on which the electrical port device 14 is installed. The gasket 28 comprises a ring 28a, a flexible connector 30, and a cap or cover 32 having a tab 34 and a cylindrical-shaped collar 36 provided with outer ring-shaped sealing ridges 38. The cylindrical-shaped collar 36 is provided with an inner cylindrical-shaped cavity 36a for accommodating the plug 22 when the cap or cover 32 is installed "on" the electrical port 12. The flexible connector 30 is sufficiently flexible so that the flexible connector 30 can be bent over 180° to install the cap or cover 32 "on" the receptacle 16 to seal the receptacle water tight. To remove the cap or cover 32, a user can grip the tab 34 to pull and remove (i.e. uninstall) the cap or cover 32 from the receptacle 16.

The electrical port device 10 further comprises another electrical connector such as an electrical receptacle 40 (i.e. female connector. The electrical receptacle 40, for example, can be a plastic insert injection molded receptacle with electrical conductors, including a neutral prong receptacle 40a, an active prong receptacle 40b, and an earth prong receptacle 40c. The electrical receptacle 40 is connected to a three (3) wire electrical cord or cable 42 electrically connecting the electrical receptacle 40 to the electrical port 12 of the electrical port device 10.

The electrical receptacle 40 includes an X-shaped protrusion 40d along with a wire sleeve 40e having slots 40f to make the wire sleeve 40e flexible or bendable. The X-shaped protrusion 40d allows a user to firmly grip the receptacle 40 on both sides of the receptacle 40 using his or her fingers and thumb at surfaces 40g, and then pushing or pulling on the receptacle 40, held stationary, to respectively connect or disconnect the electrical receptacle 40 with a another electrical connector (e.g. plug).

Waterproof Receptacle

It is important and necessary to make the receptacle 16 waterproof, and to maintain the receptacle 16 and plug 22 free of water and moisture to avoid a user being accidentally shocked by an electrical short when connecting or disconnecting the plug 22, as shown in FIG. 1. Thus, it is important that the cap or cover 32 properly seal with the flange 14 of the electrical port 12. Further, in the event water or moisture enters or condenses within the receptacle 16, it is important that the receptacle drains such water or moisture via a drain. Thus, the receptacle 16 is provided with a drain 18a (e.g. drain hole) located at a lowest point within the receptacle 16 so that the water or moisture drains by gravity flow.

Figure 2:
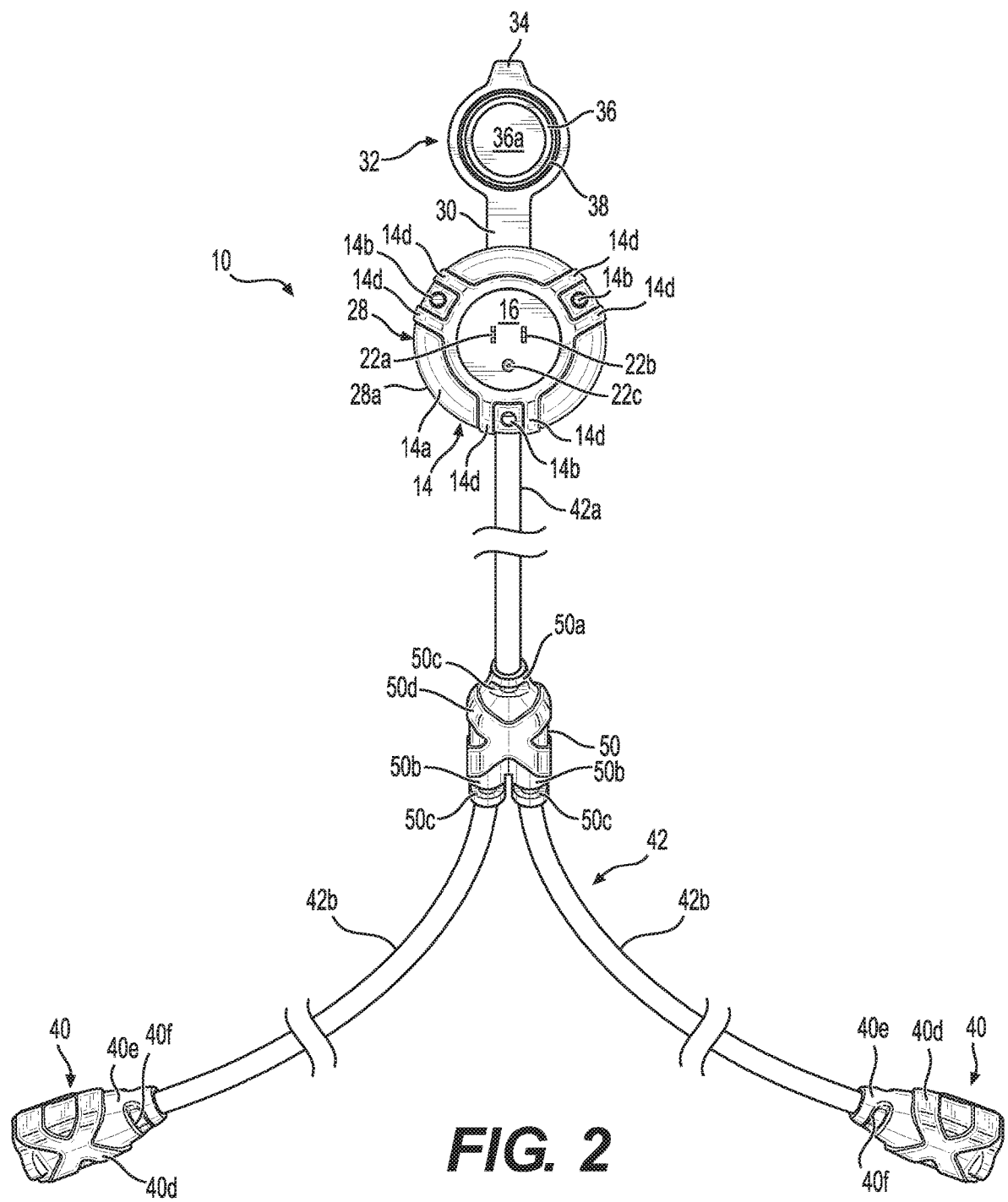
FIG. 2 is front view of the electrical port shown in FIG. 1.
Figure 3:
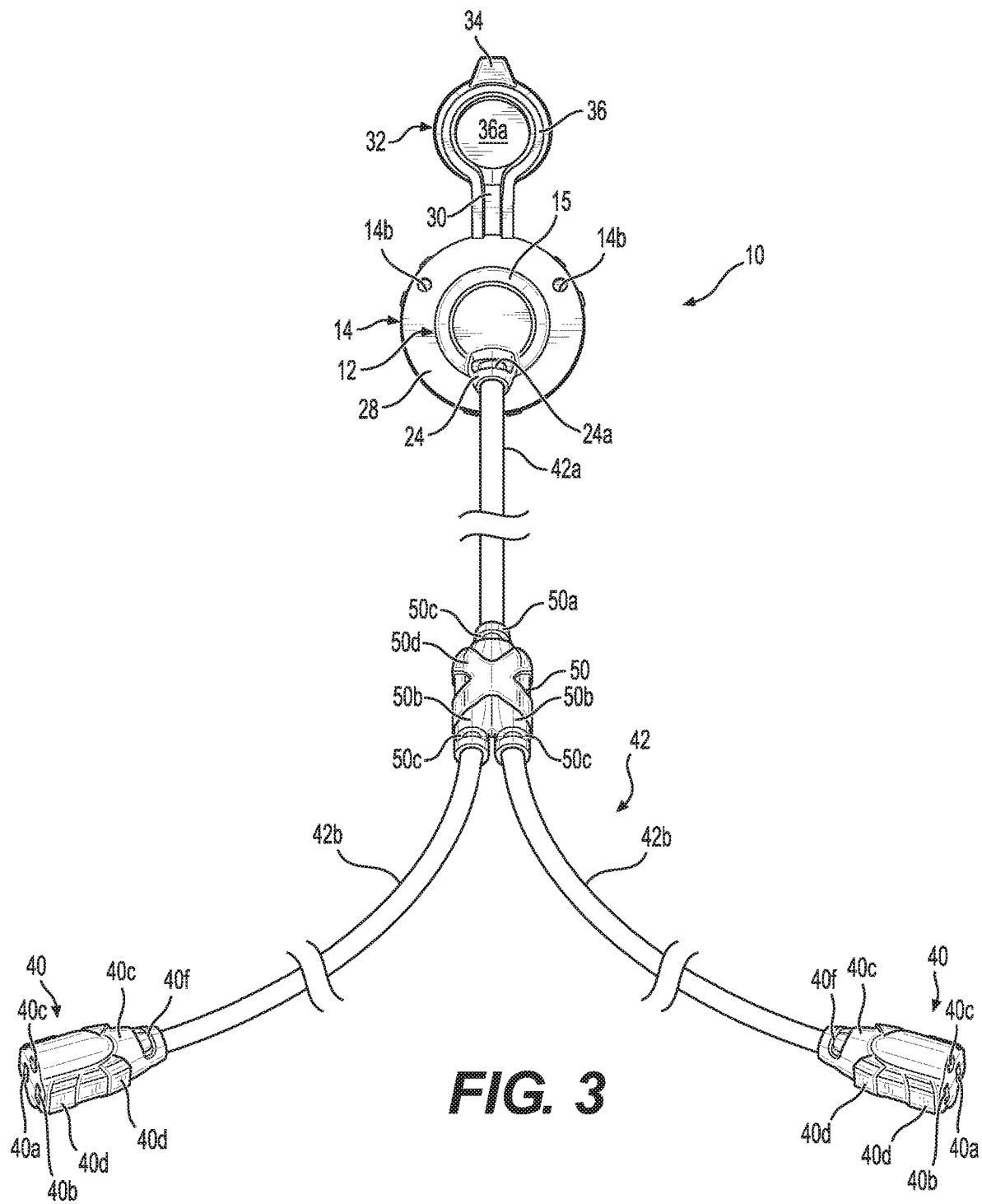
FIG. 3 is a rear view of the electrical port shown in FIG. 1.
Figure 4:
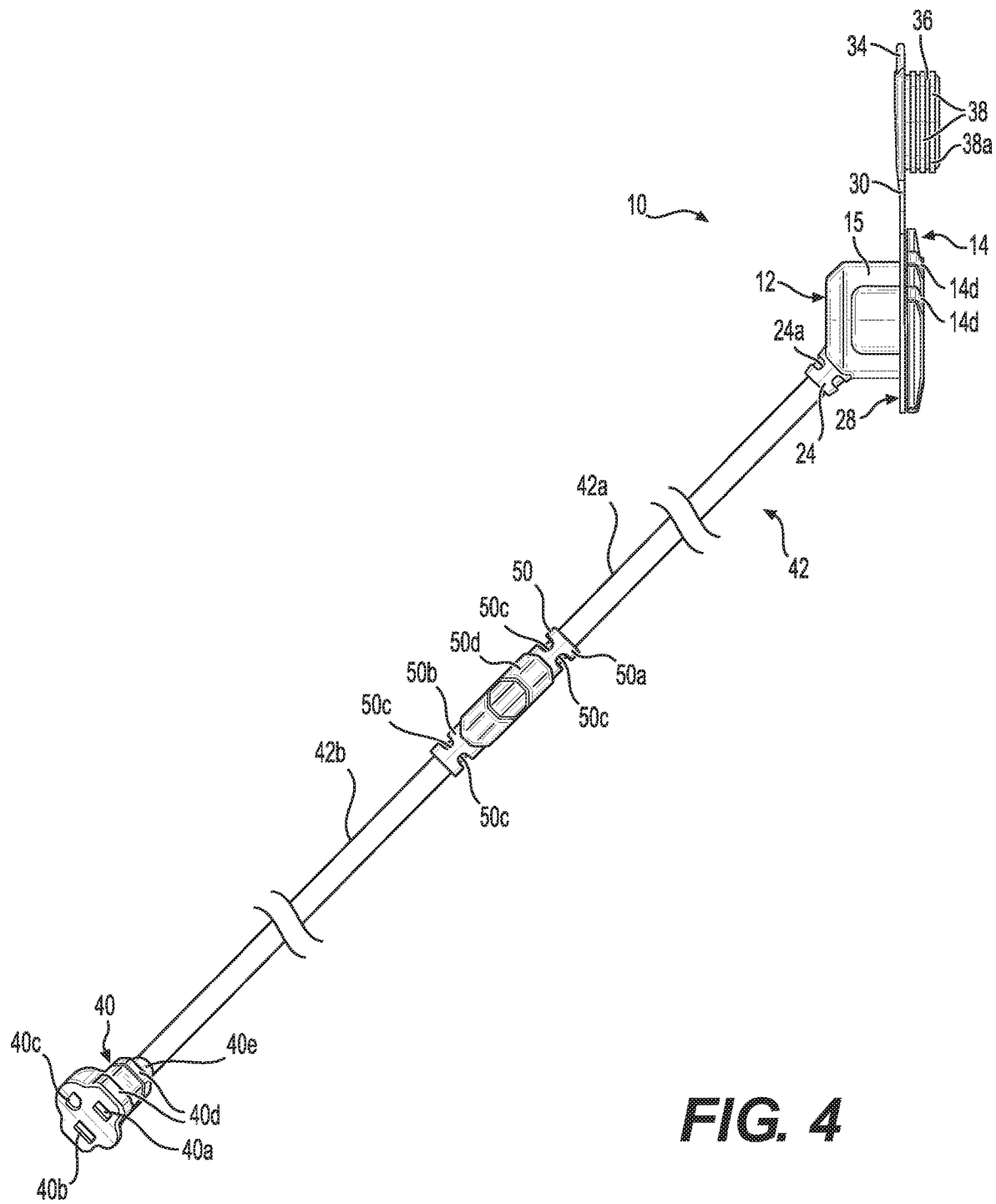
FIG. 4 is a right side elevational view of the electrical port shown in FIG. 1.
Figure 5:
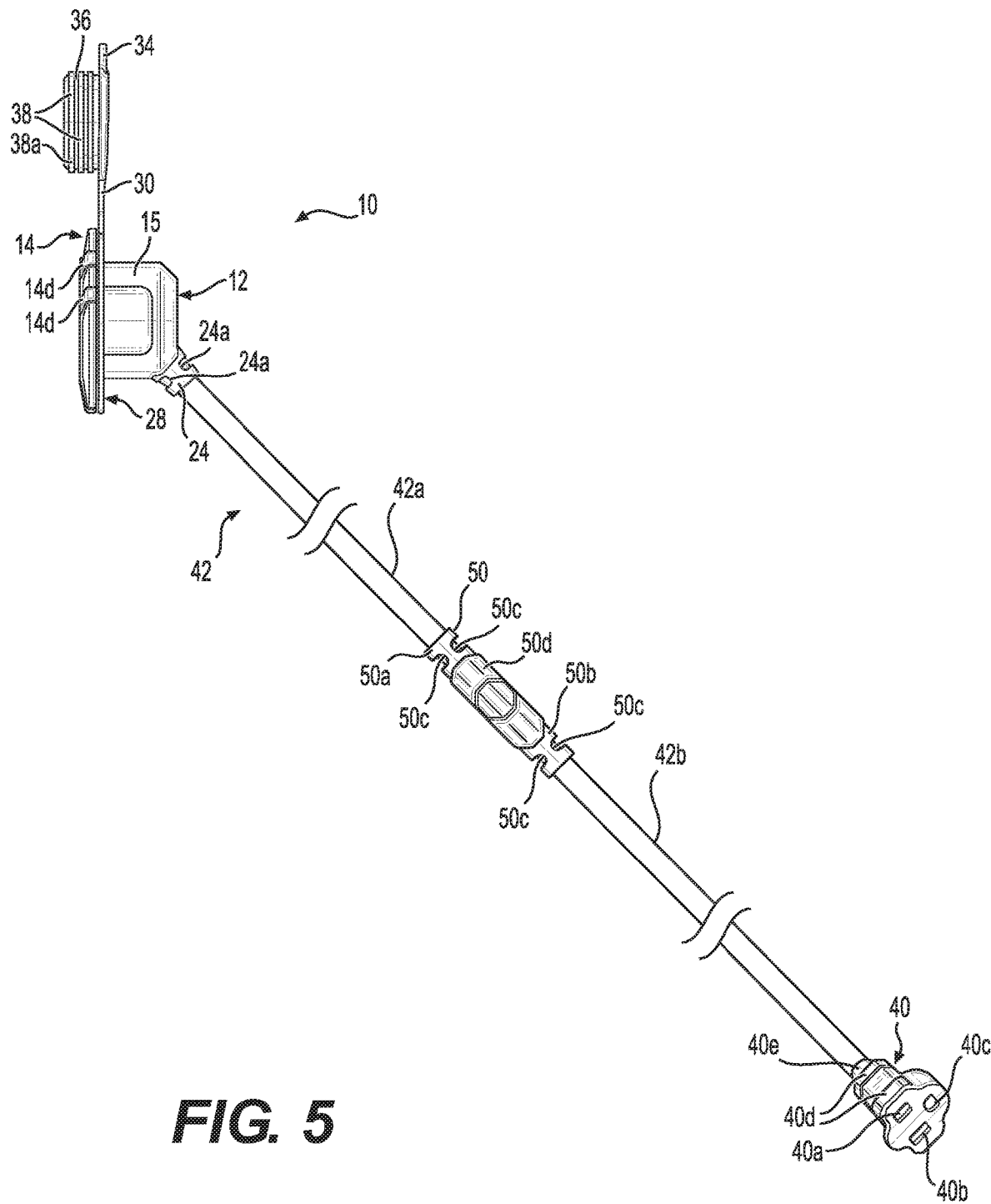
FIG. 5 is a left side elevational view of the electrical port shown in FIG. 1.
Figure 6:
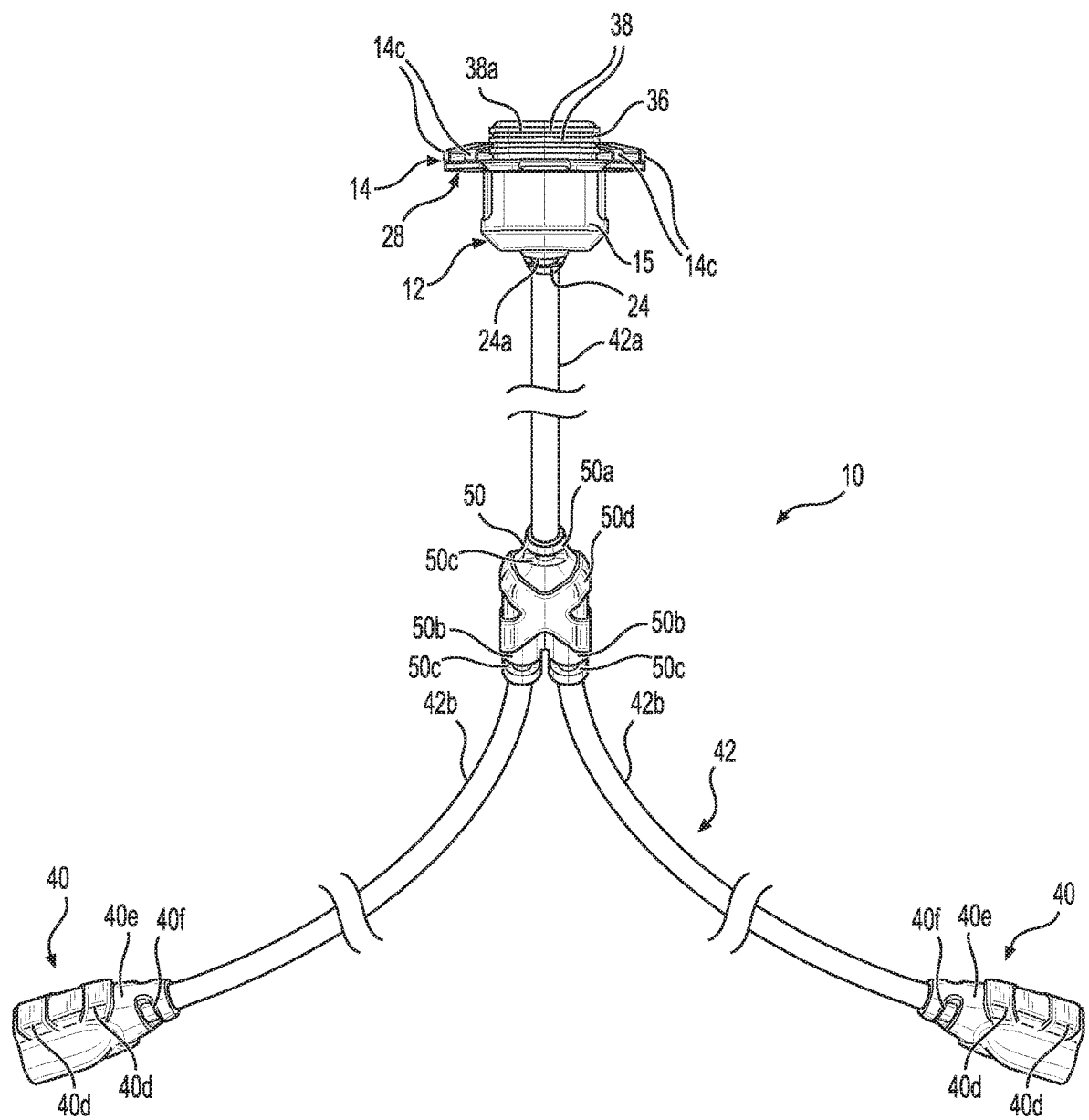
FIG. 6 is a top view of the electrical port shown in FIG. 1.
Figure 7:
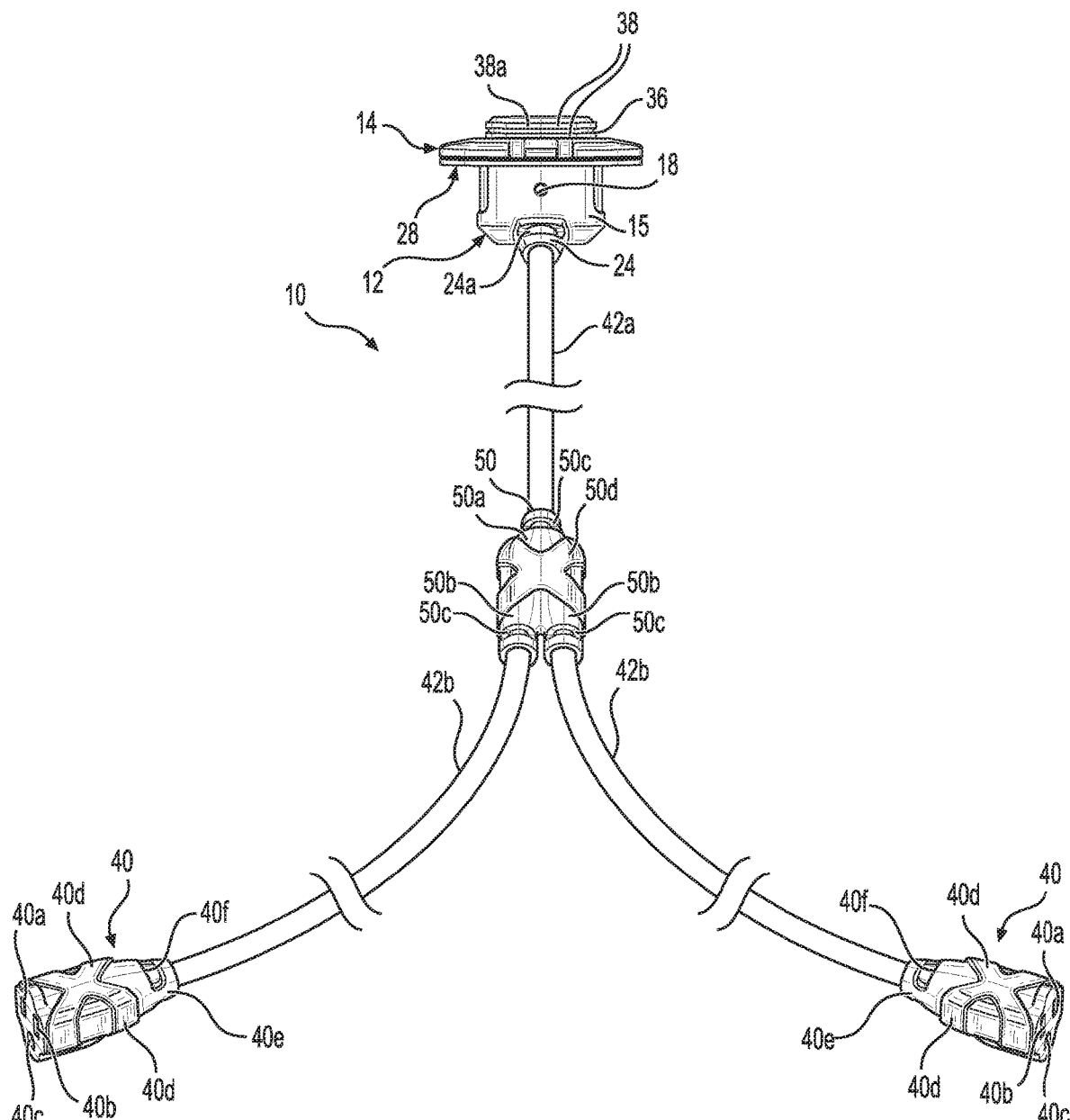
FIG. 7 is a bottom view of the electrical port shown in FIG. 1.
Figure 8:
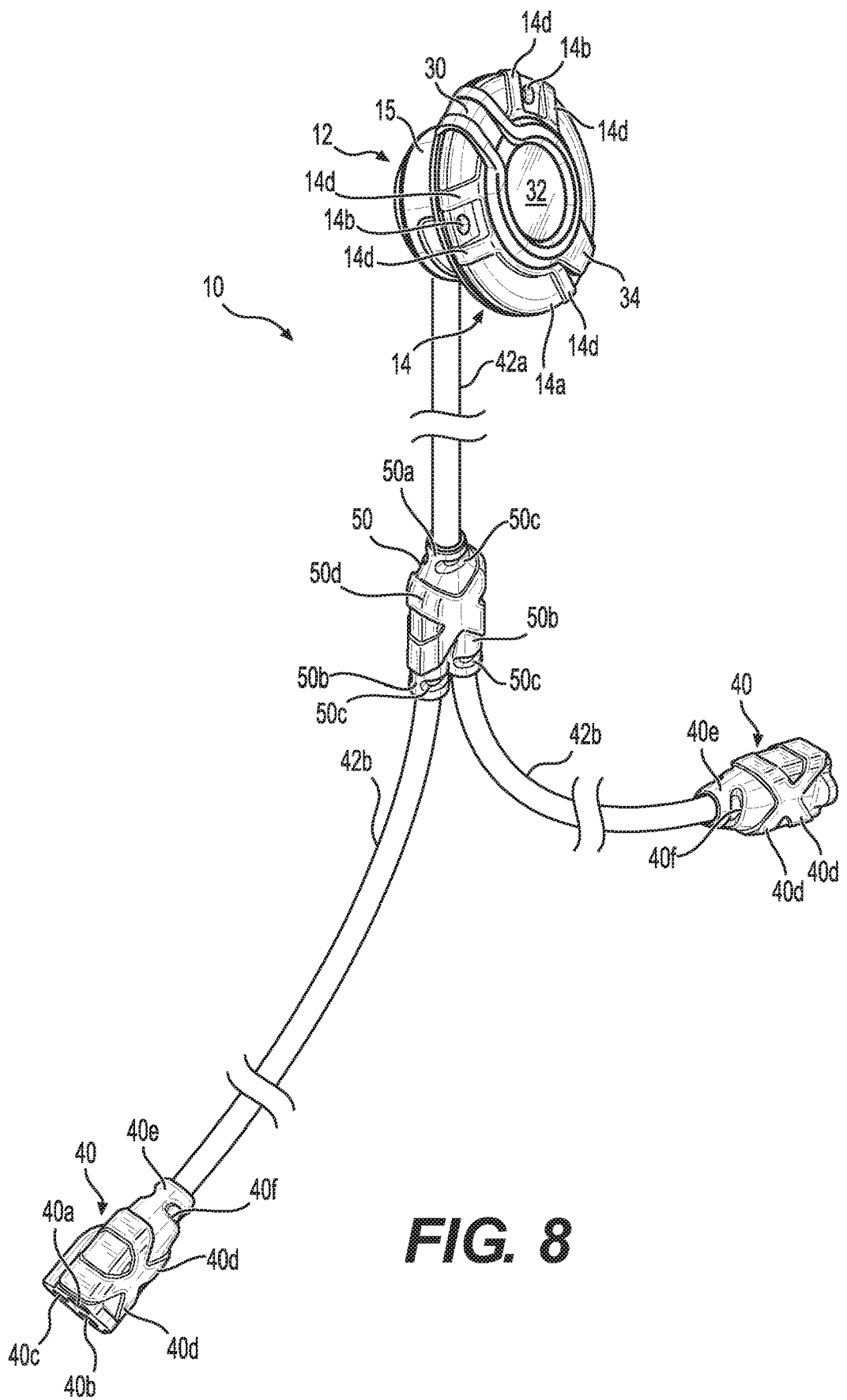
FIG. 8 is a perspective view of an electrical port according to the present invention with the cap or cover "on."

In order to properly seal the receptacle 16 water tight, the flange 14 is provided with a circular-shaped ridge 14c having an inner diameter D1 (FIG. 1) equal to or same as the diameter D1 of the receptacle 16 and an outer diameter D2 greater than the inner diameter D1 of the circular-shaped ridge 14c, and D2 is less than the outer diameter D3 of the flange 14. The flange 14 is also provided with radial ridges 14d extending radially outwardly from the outer edge of the circular-shaped ridge 14c. A pair of ridges 14d are located adjacent to the sides of each through hole 14b (FIG. 2).

The circular-shaped ridge 14c is provided with a flat sealing face 14ca (FIG. 1). The circular-shaped ridge 14c is raised above the outer face 14a of the flange 14 a predetermined height. Further, the radial ridges 14d are raised above the outer face 14a of the flange 14 a predetermined height that is less than the predetermined height of the circular-shaped ridge 14c. This arrangement allows for the inner circular-shaped flat sealing surface 32a of the cap or cover 32 to only seat with the flat face 14ca of the circular-shaped ridge 14c to ensure a good seal therebetween. Specifically, this flat-on-flat sealing arrangement between the circular-shaped flat sealing surface 32a of the cap or cover 32 and flat face 14ca of the flange 14 of the electrical port 12 enhances the ability to seal and waterproof the receptacle 16 and plug 22 to keep water and moisture out of the receptacle 16 and plug 22.

In addition, the ring-shaped ridges 38 of the cap or cover 32 are sized (e.g. predetermined diameter) and designed (e.g. specific profile or cross-sectional shape of ridges 38) so that outer edges of the ridges 38 closely fit and resiliently fit into the inner edge of the receptacle 16. For example, the multiple ridges 38 (e.g. two or more ridges) are used to provide multiple sealing engagements with, for example, a smooth inner cylindrical-shaped sealing surface 18 of receptacle 16. The ring-shaped ridges 38, for example, can have a square-shaped or rectangular-shaped profile to provide flat arcuate sealing edges that sealingly engaging the smooth inner cylindrical-shaped sealing surface 18 of the receptacle 16.

Further, the housing 15 and flange 14 of the electrical port 12 can be injection molded of rigid or semi-rigid plastic material, and the cap or cover 32 can be molded of softer and/or more resilient plastic or rubber material so that the smooth inner cylindrical-shaped sealing surface 18 exerts a band stress onto the ring-shaped outer edges 38a of the ridges 38 to increase the sealing strength of the cap or cover 32 installed "on" to flange 14 of the electrical port 12 of the electrical port device 10.

The cap or cover 32 and ring-shaped ridges 38 can be designed so that a retaining/sealing force is developed between the ridges 38 and inner cylindrical-shaped surface 18 of the receptacle 16 to tightly seal and retain the cap or cover 32 within the receptacle 16. Further, the retaining force applies a sealing force between the sealing surface 38a of the cap or cover 38 and the flat sealing face 14ca of the circular-shaped ridge 14c of the flange 14 of the electrical port 12 of the electrical port device 10.

For example, the cap or cover 38 can be made of resilient plastic or rubber material so that when collar 36 of the cap or cover 32 is fully inserted into the receptacle 16, a user can press on the center of the cap or cover 32 with his or her finger or thumb to even further insert the collar 36 into the receptacle 16 so that the collar 36 applies a resilient retaining force on the cap or cover 32, which applies a resilient sealing force between the inner circular-shaped flat sealing surface 32a of the cap or cover 32 and the flat face 14ca of the circular-shaped ridge 14c to enhance the sealing force there between, which is then maintained.

Electrical Cord or Cable Connector

The electrical port device 10 comprises an electrical cord or cable connector 50 configured to connect one electrical cord or cable section 42a located between the cord or cable connector 50 and the electrical port 12 with a pair of electrical cord or cable sections 42b, respectively, located between the cord or cable connector 50 and the electrical receptacles 40. The electrical cord or cable connector 50 functions as an electrical splitter for splitting the electrical cord or cable section 42a into the pair of electrical cord or cable sections 42b. Thus, the one path of electrical current flowing through electrical cord or cable section 42a is split into two paths of electrical current flowing through the electrical cord or cable sections 42b.

The electrical cord or cable connector 50 is configured with the one electrical cord or cable section 50a connected to one side of the electrical cord or cable connector 50 and the pair of electrical cord or cable sections 50b connected to an opposite side of the cord or cable connector 50.

The one electrical cord or cable section 50a is oriented parallel with respect to the pair of electrical cord or cable sections 50b. The electrical cord or cable sections 50a, 50b each have one or more slots 50c (FIG. 1) to enhance the flexibility of connections between the electrical cord or cable sections 50a, 50b and the electrical cord or cable connector 50.

The electrical cord or cable connector 50 is shown in FIG. 2 having a length greater than a width of the cord or cable connector. This allows the cord or cable connector to easily pass, for example, through a hole cut into a wall for mounting the electrical port device 10 in the wall.

The electrical cord or cable connector 50 is provided with an X-shaped protrusion 50d to enhance gripping of the cord or cable connector between a user's fingers and/or thumb.

The electrical cable or cord connector 50, for example, is made of resilient plastic material injection molded with the electrical connections between the electrical cord or cable section 50a and the pair of electrical cord or cable sections 50b.

Alternatively, the electrical cord or cable connector 50 can be configured to provide two separate electrical circuits to the electrical port 12. For example, the electrical cord or cable section 42a comprise two wire sets (e.g. earth, neutral, ground wires) each directly wired to each of the pair of electrical cord or cable sections 42b.

The invention claimed is:

1. An electrical port device, comprising:
   an electrical port having a housing provided with a receptacle and a flange surrounding the receptacle, the flange having a circular-shaped sealing ridge with a flat sealing face elevated a predetermined distance about an outer face of the flange;
   an electrical plug disposed within the receptacle;
   a cover removable disposed within the receptacle to cover and uncover the electrical plug, the cover including an inner circular-shaped sealing surface for sealingly cooperating with the circular-shaped ridge of the flange of the electrical port
   two or more electrical receptacles; and
   an electrical cord or cable electrically connecting together the electrical port and the two or more electrical receptacles.

2. The device according to claim 1, wherein a length of the electrical cord or cable connector is greater than a width of the electrical cord or cable connector.

3. The device according to claim 1, wherein the electrical cord or cable connector is provided with an X-shaped protrusion to enhance gripping of the electrical cord or cable connector by a user.

4. The device according to claim 1, wherein the cover comprises a collar for fitting into the receptacle of the electrical port.

5. The device according to claim 1, wherein the collar comprises one or more outer ridges.

6. The device according to claim 1, wherein the receptacle is provided with a protrusion to facilitate gripping of the receptacle by a user.

7. The device according to claim 1, wherein the cord or cable connector is provided with an X-shaped protrusion.

8. The device according to claim 1, wherein the housing is provided with a venting/drain hole.

9. The device according to claim 1, further comprising a gasket provided on an inner side of the flange of the electrical port.

10. The device according to claim 9, wherein the cover or cap is connected to the gasket.

11. The device according to claim 10, wherein the cover or cap is connected to the gasket by a flexible connector.

12. The device according to claim 11, wherein the cover, gasket, and flexible connector are constructed as a single piece.

13. The device according to claim 1, wherein the electrical cord or cable comprises a cord or cable connector configured to connect one electrical cord or cable section located between the cord or cable connector and the electrical port and electrically connecting a pair of electrical cord or cable sections located between the cord or cable connector and the two or more electrical receptacles, respectively.

14. The device according to claim 13, wherein the one electrical cord or cable section and the pair of electrical cord or cable sections each having one or more slots to enhance the flexibility of electrical cord or cable connections with the electrical cord or cable connector.

15. The device according to claim 13, wherein the electrical cord or cable connector is an electrical splitter that mechanically and/or electrically splits the one electrical cord or cable section into the pair of cord or cable sections.

16. The device according to claim 13, wherein the one electrical cord or cable connector section is connected to one side of the electrical cord or cable connector and the pair of electrical cord or connector sections are connected to an opposite side of the electrical cord or cable connector.

17. The device according to claim 16, wherein the electrical cord or cable connector is configured so that the one electrical cord or cable section is oriented parallel with respect to the pair of electrical cord or cable sections.

\* \* \* \* \*